United States Patent [19]

Gantz et al.

[11] 4,232,075

[45] Nov. 4, 1980

[54] PLASTIC MIRROR ARTICLE AND METHOD OF MAKING SAME

[75] Inventors: William A. Gantz; David M. Gantz, both of Berkeley, Calif.

[73] Assignee: Gantec Corporation, Emeryville, Calif.

[21] Appl. No.: 970,909

[22] Filed: Dec. 19, 1978

[51] Int. Cl.² ................... G02B 5/08; B32B 31/18; B32B 31/20

[52] U.S. Cl. .................. 428/124; 156/257; 156/268; 156/311; 264/1; 264/39; 427/168; 427/289; 427/370; 428/156; 428/409; 428/913; 350/306

[58] Field of Search ............... 350/305, 306; 427/168, 427/164, 289, 290, 370; 264/1, 39; 156/257, 268, 311, 322, 327; 428/124, 130, 156, 409, 913

[56] References Cited

U.S. PATENT DOCUMENTS

| | | | |
|---|---|---|---|
| 1,941,438 | 12/1933 | Kiefer | 427/164 |
| 2,680,695 | 6/1954 | Judd | 427/164 |
| 3,489,067 | 1/1970 | Hallis | 427/290 X |
| 3,761,338 | 9/1973 | Ungar et al. | 428/409 X |
| 4,101,707 | 7/1978 | Henry | 428/409 |
| 4,119,107 | 10/1978 | Pinzone et al. | 350/306 X |

*Primary Examiner*—Harold Ansher
*Attorney, Agent, or Firm*—Townsend and Townsend

[57] ABSTRACT

A mirror construction and method wherein shatter resistant optical quality first surface mirrors may be inexpensively fabricated. A styrene sheet is press polished and the polished surface is coated with a reflective layer. The press polished, reflectively coated styrene sheet may be subjected to further processing steps in order to produce a highly rigid and flat mirror. A surface of the styrene sheet is scored along a straight line to a depth that does not penetrate the front mirrored surface, but rather leaves a relatively thin region along the scored line having a minimal extent in the plane of the sheet. The styrene sheet is then folded, bringing portions on either side of the scored line towards each other and partially splitting the thin region. A membrane remains along the scored line to form a semi-flexing hinge. The ability of the membrane to withstand cracking can be improved somewhat by carrying out the folding step at a temperature generally greater than approximately 20° C.

12 Claims, 6 Drawing Figures

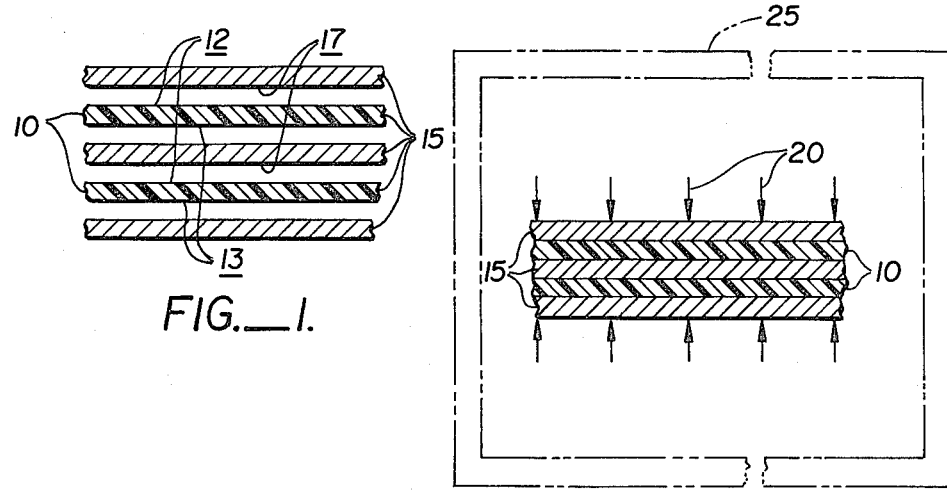
FIG._1.
FIG._2.
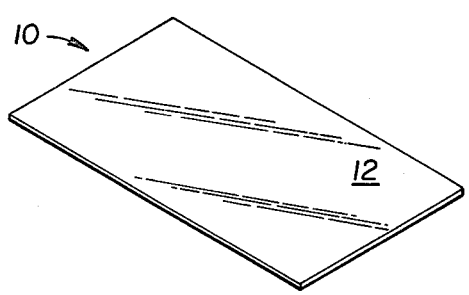
FIG._3.
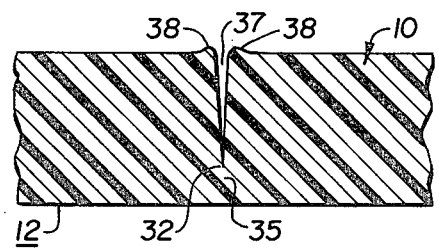
FIG._5.
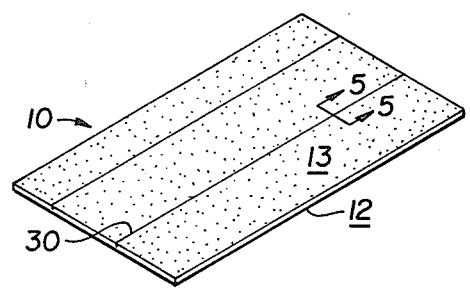
FIG._4.
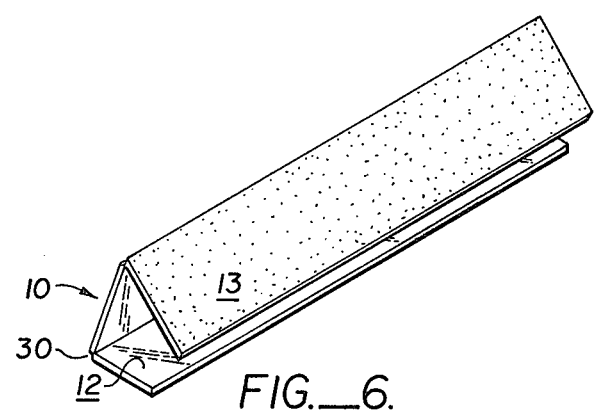
FIG._6.

PLASTIC MIRROR ARTICLE AND METHOD OF MAKING SAME

FIELD OF THE INVENTION

This invention relates generally to plastic mirrors, and more specifically to a method of forming an optical quality first surface mirror from a styrene sheet.

BACKGROUND OF THE INVENTION

The folklore provides numerous and occasionally bizarre examples of people's fascination with mirror surfaces. While the experiences of Greek mythology's Narcissus and Lewis Carroll's Alice were probably atypical, the preoccupation with reflected images was not. Most adult users tend to regard mirrors as utilitarian devices, but young children are able to derive an enormous amount of satisfaction and delight from nothing more than a simple plane mirror. It is therefore not surprising that many children's toys incorporate a mirror to provide additional amusement for the juvenile user. More sophisticated amusement devices such as kaleidoscopes appeal to people of all ages.

While mirrors have traditionally been made of glass, glass mirrors are often unsuitable due to their weight and tendency to shatter. It is clear that a broken mirror in a child's toy can present many serious dangers in addition to and more immediate than the proverbial seven years' bad luck. Other applications of a lightweight, non-breakable reflecting surface range from pocket mirrors and Chirstmas tree ornaments to large arrays of solar collectors. Such articles would benefit from having a high quality first surface mirror incorporated into them.

It is known to fabricate certain thermoplastic materials with a smooth surface finish by a press polishing technique wherein a relatively thin sheet is pressed against a flat polished surface on a master (typically a metal plate) and heated to a flowing temperature while under pressure. The sheet is then cooled and the pressure released, at which stage the surface of the plastic sheet that was pressed against the smooth polished surface of the master exhibits the characteristics of the smooth polished master. Suitable materials for press polishing include acrylic, polycarbonate, and vinyl resins. It is known to place a reflective surface on a plastic substrate by any one of a number of standard methods including vacuum deposition. Moreover, high quality second surface mirrors comprising a thin metallic film on an acrylic sheet are known.

Mirrors fabricated from the plastic materials enumerated above have serious drawbacks that tend to limit their use in toys and the like. For example, acrylic is brittle and easy to shatter, leaving sharp edges that pose the same danger as glass. Moreover, the above-mentioned materials are relatively expensive. In the context of toys, novelty items, and other similar articles that are mass produced for sale in a highly competitive market, the fabrication cost is an especially critical parameter. In the context of solar collectors, cost is of great importance due to the large amount of reflecting surface involved.

While certain applications only require a smooth shiny surface without regard for flatness, other applications require that the mirrored surface be substantially flat in order to produce the desired effect. For example, the visual effect of a kaleidoscope is considerably enhanced by the provision of high quality, optically flat mirrors. Yet the sheet materials discussed above are relatively flexible, and therefore cannot be self-supporting over any significant area. This problem is aggravated by cost considerations that dictate the use of the thinnest possible sheet since the material cost is directly proportional to the weight (hence the thickness) of the plastic sheet.

SUMMARY OF THE INVENTION

The present invention provides a mirror construction and method wherein optical quality first surface mirrors may be fabricated for substantially less cost than that encountered in using previously known methods. This considerable cost reduction is achieved by using high impact polystyrene (hereinafter sometimes referred to as "styrene") as the basic material. While the softness of styrene renders it an unlikely candidate for press polishing, it has been found that press polishing techniques can be advantageously applied to styrene, and the polished surface, once coated with a reflective layer, exhibits a surprising resistance to abrasion.

According to a further aspect of the present invention, the press polished, reflectively coated styrene sheet may be subjected to further processing steps in order to produce a highly rigid and flat mirror surface. The reverse surface of the styrene sheet from the reflectively coated surface is scored along a straight line to a depth that does not penetrate the front mirrored surface, but rather leaves a relatively thin region along the scored line having a minimal extent in the plane of the sheet. The styrene sheet is then folded, bringing portions of the reflective surface on either side of the scored line towards each other. During folding, the thin region along the scored line partially splits to define a membrane which functions as a semi-flexing hinge. While other materials may be fabricated in this manner, styrene is especially well suited to this type of fabrication since it is relatively pliable. Therefore, the membrane is capable of withstanding the folding step without fracturing or cracking. By way of contrast, acrylic is far too brittle, and the two portions of the sheet surrounding the scored line tend to separate or break away on folding. Nevertheless, it should be noted that while styrene appears to exhibit the most favorable folding characteristics, a mirror fabricated from styrene sheet is typically unable to withstand more than one or two repetitions of folding along the scored line without fracturing. The flexibility of the membrane can be improved somewhat by carrying out the folding step at a temperature generally greater than approximately 20° Centigrade (68° Fahrenheit).

The folded mirror construction described above is particularly well suited to use in an optical image multiplying device of the kaleidoscopic variety due to the need in such a device for multiple plane mirrors in an angular relationship to one another. The scored folded joint, in addition to providing stiffness and flatness to the individual mirror panels, also holds the mirrors in proper alignment relative to one another, thereby reducing the number of additional fabrication steps.

Thus it can be seen that the present invention provides a low cost, shatter resistant mirror material which can be formed into a surprisingly flat mirror. For a further understanding of the nature and advantages of the present invention, reference should be had to the ensuing detailed description and appended drawings.

BRIEF DESCRIPTION OF THE DRAWINGS

FIG. 1 is a sectional view showing portions of plastic sheets interleaved with metal masters prior to press polishing;

FIG. 2 is a sectional view showing the portions of the sheets of FIG. 1 being subjected to heat and pressure during press polishing;

FIG. 3 shows a press polished sheet of plastic having a reflective coating thereon;

FIG. 4 shows the reverse surface of the sheet of FIG. 3 after the sheet has been subjected to a scoring step;

FIG. 5 is a detailed sectional view along line 5—5 of FIG. 4; and

FIG. 6 shows a finished mirror product suitable for use in a kaleidoscope.

DETAILED DESCRIPTION OF THE INVENTION

FIGS. 1 and 2 illustrate in schematic form a press polishing process that may be applied to plastic sheets in order to provide at least one smooth surface on each plastic sheet. Press polishing is a known process and is carried out commercially by the Lustro Company, Chicago, Ill. While it is known to perform the press polishing operation on acrylic, polycarbonate, and vinyl, the present invention envisions performing the technique on styrene.

As is shown in FIG. 1, members of a plurality of plastic sheets 10, each of which has a first surface 12 and a second surface 13, are sandwiched among a plurality of masters 15. Each master 15 is typically a metal plate, and with the possible exception of the plate at the top and/or bottom of the stack, each has a smooth polished surface 17. Sheets 10 and masters 15 are arranged so that each surface 12 faces a smooth polished surface 17.

As shown in FIG. 2, the assembly comprising plastic sheets 10 and metal masters 15 is then subjected to considerable uniform pressure as indicated by arrows 20. Suring the time that sheets 10 are subjected to the pressure between masters 15, the entire assembly is heated, as for example by placement in an oven 25, shown schematically in phantom. Heat is added relatively slowly in order to minimize possible distortions due to temperature gradients. When the temperature of the sheets is sufficiently high that the plastic flows, surfaces 12 and 13 of each sheet conform to the surfaces of the masters with which they are in contact. In particular, each surface 12 conforms to a corresponding surface 17. The assembly is then allowed to cool gradually while the pressure is maintained. Once the plastic sheets have cooled to a temperature below that at which the plastic exhibits flow characteristics, the composite assembly may be taken apart and the individual sheets removed.

FIG. 3 shows a single one of sheets 10 after it has been subjected to the press polishing process of FIG. 2. Since first surface 12 was in contact with polished surface 17 of one of masters 15, surface 12 has a smooth polished finish that is substantially free of surface irregularities. Surface 12 is then subjected to a conventional first coating step wherein a reflective layer of a metal such as aluminum or chromium is deposited in the form of a thin film on surface 12. A second coating step deposits a layer of material such as silicon dioxide over the metallic film to protect it from abrasion and/or oxidation. The technology for performing these coating steps is well within the ability of one ordinarily skilled in the art and will not be discussed in further detail.

Reflectively coated sheet 10 forms a suitable mirror material for use in a number of articles. For example, Christmas tree ornaments of relatively small size may be stamped from the sheet. The use of styrene allows such mirror material to be fabricated relatively inexpensively. However, it should be noted that sheet 10 is typically rather thin, a thickness of approximately 0.75 millimeters (0.030 inches) being typical in novelty items and toys. In such thicknesses, a styrene sheet is relatively flexible and cannot be self-supporting over a distance of more than a few centimeters.

FIGS. 4–6 illustrate further steps that may be performed on sheet 10 to provide optically flat mirrors for use in devices requiring a high degree of flatness, such as kaleidoscopes. As shown in FIG. 4, surface 13, the non-mirrored surface, is scored along one or more straight lines 30 to a depth that does not penetrate the full thickness of sheet 10. This relationship is shown more clearly in FIG. 5. The cut has a bottom 32 at a depth that is preferably a major portion of the sheet thickness, leaving a relatively thin portion 35 between surface 12 and bottom 32. The scoring step may be carried out by any apparatus suitable for providing a very straight cut of uniform depth. The ultimate flatness of the finished mirror article depends on this. In order to minimize the distortion of material in sheet 10, the blade used to provide the cut should be thin. Even then, a certain amount of material displacement is inevitable, typically resulting in a V-shaped groove 37 and ridges 38 along either side of groove 37.

Once sheet 10 has been scored, it is folded along the scored line so as to open and deepen groove 37. During the folding operation, the material in region 35 on either side of the cut separates, starting at cut bottom 32 and extending toward surface 12 as the fold angle is increased. So long as the cut is straight and the bottom sharply defined, the separation occurs substantially along the straight line of the cut. However, the portions of the sheet on opposite sides of the cut do not separate, but are held together by a very thin region or membrane proximate surface 12. This region defines a hinge member of minimal thickness and minimal extent in the plane of the sheet.

It appears that the press polishing step is at least partially responsible for the hinge member's ability to withstand fracturing. The ability of the hinge member to withstand fracturing is still rather limited, but can be improved somewhat by performing the folding step at a temperature generally above about 20° C. and preferably above about 24° C.

Since, as described above, the partial cleavage of portion 35 occurs along substantially the same straight line as the original cut, the regions of surface 12 on either side of the fold reinforce one another to provide very flat reflective surfaces. Thus a surprising degree of optical flatness is achieved in a mirror constructed from relative flexible material.

It can be seen that the mirror construction described above is peculiarly well-suited to a device requiring a plurality of mirrors in an angular relationship to one another. A kaleidoscope is such a device. FIGS. 4 and 6 show sheet 10 having been scored and partially folded along two parallel straight lines in the process of forming a three mirror assembly suitable for use in one type of kaleidoscope. In such an assembly, the mirrors are self aligning without the necessity of performing further fabrication or alignment steps or providing additional supporting structure.

In summary, it can be seen that the present invention provides an inexpensive unbreakable mirror having a high degree of optical flatness. For example, styrene mirrors of high optical quality for a kaleidoscope can be fabricated for less than one third of the cost encountered in previously known methods. While the above provides a full and complete disclosure of the preferred embodiments of the invention, various modifications, alternate constructions, and equivalents may be employed without departing from the true spirit and scope of the invention. For example, it is possible to score the mirrored surface to provide individual mirror panels that face generally away from each other. Alternately the scoring step may remove material so the the scored groove has a relatively large angle and the fold may be made in the direction of closing the groove. Therefore, the above description and illustrations should not be construed as limiting the scope of the invention, which is defined by the appended claims.

What is claimed is:

1. A method of forming an optical quality smooth surface on a high impact polystyrene sheet having first and second surfaces comprising the steps of:
   (a) placing the first surface of the sheet in contact with a master having a highly polished surface;
   (b) pressing the sheet against the highly polished surface;
   (c) heating the sheet to a temperature at which the high impact polystyrene flows while maintaining the pressure between the sheet and the highly polished surface;
   (d) allowing the sheet to cool to a temperature below that at which the high impact polystyrene flows; and
   (e) releasing the pressure between the cooled sheet and the polished surface.

2. The method of claim 1 wherein said step (e) of releasing the pressure is followed by the step (f) of depositing a reflective coating on the first surface of the styrene sheet.

3. The method of claim 2 further including the steps of:
   (g) scoring the sheet along a straight line on one of the surfaces to a depth less than the sheet thickness to form a thin portion of minimal extent in the plane of the sheet perpendicular to the straight line; and
   (h) folding the sheet along the scored line such that segments of the sheet on either side of the thin portion are brought toward one another and the first surface in the vicinity of the fold is maintained flat and rigid to form an optical quality mirror surface.

4. The method of claim 3 wherein said scoring step (g) forms an angularly narrow groove and wherein said folding step (h) is performed in a direction that opens the groove.

5. The method of claim 3 wherein said scoring step (g) is performed on the second surface of the sheet.

6. The method of claim 3 wherein said folding step (h) is performed at a temperature above 20° Centigrade.

7. A method of forming an optical quality first surface mirror from a sheet of relatively flexible thermoplastic material comprising the steps of:
   press polishing the sheet to form an optical quality smooth surface substantially free of surface irregularities;
   depositing a reflective coating on the smooth surface;
   scoring the sheet along a straight line on its reverse surface from the smooth surface to a depth that does not penetrate the sheet, thereby leaving a thin portion having minimal extend along the plane of the smooth surface perpendicular to the straight line; and
   folding the sheet to bring portions of the smooth surface toward one another such that the smooth surface in the vicinity of the fold is maintained in a rigid flat condition to provide a mirrored surface of optical flatness.

8. The method of claim 7 wherein the press polishing, depositing, scoring, and folding steps are carried out on a high impact polystyrene sheet.

9. A method of forming an optical quality first surface mirror from a styrene sheet comprising the steps of:
   providing a master having an optically polished surface;
   placing a first surface of the styrene sheet against the polished surface of the master;
   exerting a pressure against the styrene sheet to urge the first surface into intimate contact with the polished surface of the master;
   heating the styrene sheet to a temperature at which the styrene material exhibits flow characteristics while maintaining the pressure;
   cooling the styrene sheet to a temperature below the temperature at which the styrene exhibits flow characteristice while maintaining the pressure;
   removing the styrene sheet from the master;
   depositing a reflective coating on the first surface of the styrene sheet;
   scoring the reverse surface of the styrene sheet from the first surface along a substantially straight line to a depth that does not penetrate the sheet to the first surface to form a thin region of minimal extend parallel to the first surface, thereby defining first and second portions of the styrene sheet on either side of the scored line; and
   folding the styrene sheet about the scored line such that portions of the reflective coating deposited on the first and second portions of the styrene sheet are brought toward one another to maintain portions of the reflective surface proximate the fold to a high degree of flatness, thereby providing an optical quality first surface mirror.

10. An article having a mirrored surface comprising a high impact polystyrene sheet having a press polished first surface and a reflective coating deposited thereon.

11. The invention of claim 10 wherein the press polished sheet has been scored along a straight line to define first and second portions of the sheet on respective sides of the line, and which has been folded along the line to bring the first and second portions of the sheet toward one another to provide rigidity and optical flatness.

12. The invention of claim 10 wherein the press polished sheet has been scored along a straight line on a surface removed from the press polished surface to define first and second portions of the press polished surface on respective sides of the line, and which has been folded along the line to bring the first and second portions of the press polished reflectively coated surface toward one another to provide rigidity and optical flatness.

* * * * *